United States Patent [19]
Steinberg

[11] Patent Number: 4,512,819
[45] Date of Patent: Apr. 23, 1985

[54] METHOD FOR MANUFACTURING A CLADDING TUBE OF A ZIRCONIUM ALLOY FOR NUCLEAR REACTOR FUEL OF A NUCLEAR REACTOR FUEL ASSEMBLY

[75] Inventor: Eckard Steinberg, Erlangen, Fed. Rep. of Germany

[73] Assignee: Kraftwerk Union Aktiengesellschaft, Mülheim, Fed. Rep. of Germany

[21] Appl. No.: 558,795

[22] Filed: Dec. 7, 1983

[30] Foreign Application Priority Data

Dec. 30, 1982 [DE] Fed. Rep. of Germany ....... 3248686

[51] Int. Cl.$^3$ ................................................ C22F 1/18
[52] U.S. Cl. ................................ 148/11.5 F; 148/133
[58] Field of Search ........................... 148/11.5 F, 133

[56] References Cited

U.S. PATENT DOCUMENTS

| | | | |
|---|---|---|---|
| 3,294,594 | 12/1966 | Bertea et al. | 148/11.5 F |
| 3,826,124 | 7/1974 | Baksay | 148/11.5 F |
| 3,963,534 | 6/1976 | Frenkel et al. | 148/11.5 F |
| 4,108,687 | 8/1978 | Armand et al. | 148/11.5 F |

*Primary Examiner*—W. Stallard
*Attorney, Agent, or Firm*—Herbert L. Lerner; Laurence A. Greenberg

[57] ABSTRACT

Method for manufacturing a cladding tube of a zirconium alloy for the nuclear reactor fuel of a nuclear reactor fuel assembly by deformation of a starting tube and subsequent post-treatment of the deformed starting tube. The deformed starting tube is first ground on the outside surface for the post-treatment and is then subjected to a final annealing treatment.

3 Claims, No Drawings

METHOD FOR MANUFACTURING A CLADDING TUBE OF A ZIRCONIUM ALLOY FOR NUCLEAR REACTOR FUEL OF A NUCLEAR REACTOR FUEL ASSEMBLY

BACKGROUND OF THE INVENTION

1. Field of the Invention

The invention relates to a method for manufacturing a cladding tube of a zirconium alloy for nuclear reactor fuel of a nuclear reactor assembly through deformation of a starting tube and subsequent post-treatment of the deformed starting tube.

2. Description of the Prior Art

It is customary to perform the deformation of the starting tube by the Pilger process or by rolling. For the post-treatment, the deformed output tube is first annealed and thereafter ground at the other surface as the final operation.

SUMMARY OF THE INVENTION

An object of the invention is to provide an improved method of manufacturing a cladding tube of a zirconium alloy for nuclear reactor fuel which has reduced corrosion of the outer surface of the cladding tube which corrosion results from insertion as a fuel rod of a nuclear reactor fuel assembly into a water-cooled nuclear reactor.

With the foregoing and other objects in view, there is provided in accordance with the invention a method for manufacturing a cladding tube of a zirconium alloy for the nuclear reactor fuel of a nuclear reactor fuel assembly by deformation of a starting tube and subsequent post-treatment of the deformed starting tube, the improvement comprising imparting increased corrosion resistance to the outer surface of the cladding tube by first grinding the outer surface of the deformed tube for the post-treatment and then subjecting the ground tube to a final annealing treatment.

Other features which are considered as characteristic for the invention are set forth in the appended claims.

Although the invention is illustrated and described herein as embodied in a method for manufacturing a cladding tube of a zirconium alloy for nuclear reactor fuel of a nuclear reactor fuel assembly, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

The method for manufacturing a cladding tube of a zirconium alloy with an outer surface significantly more resistant to corrosion, is characterized by the feature that the deformed starting tube is first ground at the outer surface for the post-treatment and is then subjected to a final annealing treatment.

The invention is based on the insight that, while the internal stresses in the tube alloy caused by the deformation are broken down by the annealing and/or partial or complete recrystallization of the tube alloy is achieved, a deformation in the surface structure which favors corrosion again takes place due to the grinding of the outer surface of the tube after the annealing. In accordance with the invention, the deformed output tube is subjected to a final annealing treatment after the outer surface has been found, with the consequences that deformation of the surface structure of the tube are very largely cancelled, and the corrosion markedly decreased.

It is advantageous to remove, by grinding, a surface layer with a thickness in the range of 1–10 mm from the outer surface of the deformed output tube. It is further of advantage to heat the deformed output tube in the final annealing treatment to a temperature in the range of 450° to 650° C.

The invention and its advantages will be explained in greater detail with the aid of two examples. In the first example, the deformed tube was first annealed and thereafter ground at the outer surface as the final operation as was the practice in the prior art. In the second example in accordance with the invention, the deformed tube is first ground at the outer surface and then subjected to a final annealing treatment.

Starting tubes of a zirconium alloy designated as zircaloy 2 which contains 1.2 to 1.6% by weight tin, 0.07 to 0.02% by weight iron, 0.05 to 0.15% by weight chromium, 0.03 to 0.08% by weight nickel, 0.07 to 0.15% by weight oxygen and the remainder zirconium, were deformed in four Pilger passes from an outside diameter of 63 mm and a wall thickness of 11 mm to an outside diameter of 12.5 mm and a wall thickness of 0.85 mm, and were first annealed for two hours at 600° C. Subsequently, after cooling down, a layer 5 $\mu$m thick was ground off the outside surfaces of the tubes. These tubes were then subjected in an autoclave to steam at a pressure of 125 bar and a temperature of 500° C. for 24 hours. The typical weight increase of the steam-treated tubes by corrosion varies within the range of 200 to 500 mg per square decimeter of the outer tube surface.

Similarly, tubes of the same material obtained by the Pilger process and having the same dimensions are now ground on the outside surface in order to remove a surface layer of the same thickness and, thereupon, are subjected to the same final annealing treatment. The corrosion test with the autoclave under the same test conditions resulted in a weight increase of the tubes by corrosion which is only in the range of 50 to 200 mg per square decimeter of outside tube surface.

The foregoing is a description corresponding, in substance, to German application No. P 32 48 686.3, dated Dec. 30, 1982, international priority of which is being claimed for the instant application, and which is hereby made part of this application. Any material discrepancies between the foregoing specification and the specification of the aforementioned corresponding German application are to be resolved in favor of the latter.

I claim:

1. Method for manufacturing a cladding tube of a zirconium alloy for the nuclear reactor fuel of a nuclear reactor fuel assembly by deformation of a starting tube and subsequent post-treatment of the deformed starting tube, the improvement comprising imparting increased corrosion resistance to the outer surface of the cladding tube by first grinding the outer surface of the deformed tube for the post-treatment and then subjecting the ground tube to a final annealing treatment.

2. Method according to claim 1, wherein a surface layer with a thickness in the range of 1 to 10 $\mu$m is ground off the deformed starting tube.

3. Method according to claim 1, wherein the deformed tube is heated by the final annealing treatment to a temperature in the range of 450° to 650° C.

* * * * *